Jan. 19, 1932.   F. W. SPERR, JR   1,841,421
GAS PURIFICATION PROCESS AND APPARATUS
Filed Feb. 19, 1927
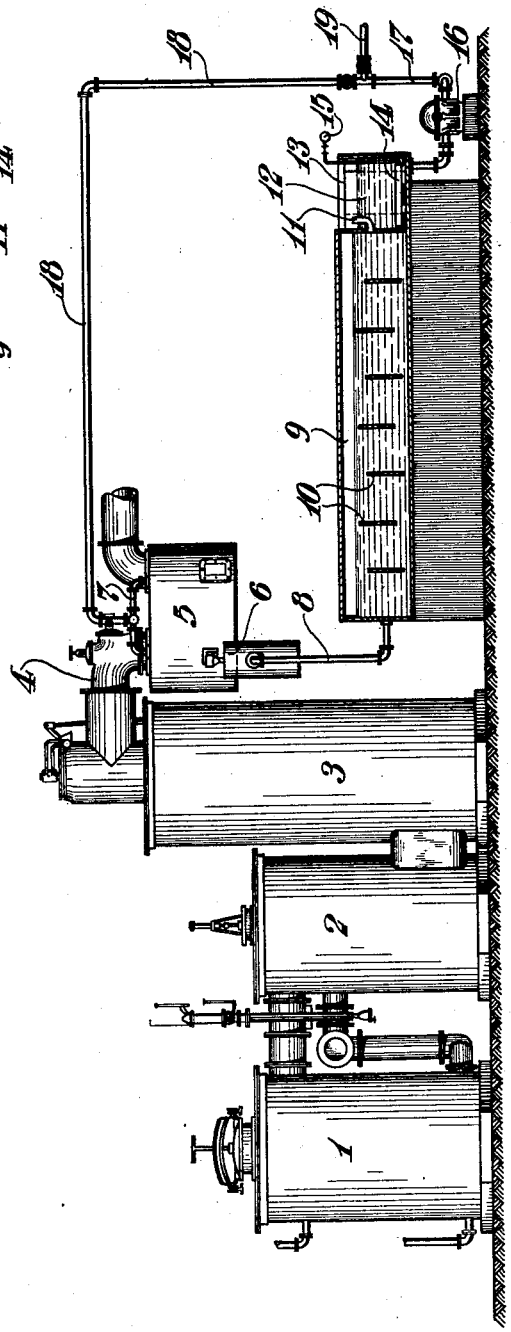
INVENTOR
Frederick W. Sperr Jr.
BY
Jesse R. Langley
ATTORNEY Patented Jan. 19, 1932

1,841,421

UNITED STATES PATENT OFFICE

FREDERICK W. SPERR, JR., OF PITTSBURGH, PENNSYLVANIA, ASSIGNOR TO THE KOPPERS COMPANY, A CORPORATION OF DELAWARE

GAS PURIFICATION PROCESS AND APPARATUS

Application filed February 19, 1927. Serial No. 169,424.

This invention relates to the purification of gas, more particularly generator gases, such as water gas, oil gas, and the like, by removing therefrom hydrogen sulphide, hydrogen cyanide and analogous acidic impurities. My invention further relates to a process for gas purification involving the circulation of an alkaline absorbent liquid through an absorption stage and an activation stage.

An object of my invention is to provide for the removal of impurities of the nature indicated from water gas without necessitating subsequent emission of noxious gas into the atmosphere.

A further object of my invention is to accomplish purification of water gas in apparatus ordinarily employed for other purposes in the manufacture of the same, without interrupting or interfering with the accomplishment of such purposes.

A process of fixing the impurities of fuel gas as alkali thiosulphate or thiocyanate by washing gas with an alkaline solution containing amounts of cobalt, nickel, or iron sulphide less than those required for the liberation of free sulphur upon aeration of said solution is described and claimed in my copending application for Letters Patent, Serial No. 124,556, filed July 24, 1926.

In the present invention, I apply the process of said application to the purification of water gas by substituting a solution of the character indicated for the wash water commonly employed for tar removal in the treatment of water gas. This solution is circulated through the wash box or tar batter and the recirculating tank in the usual manner. An absorption of the gaseous impurities is effected in the wash box and the fouled solution is then conducted to the recirculating tank which is equipped in the usual manner with suitable baffles for separating any tar entrained by the solution. In order to complete the fixation of absorbed impurities, I provide aerating means in what is known as the clean water end of the recirculating tank. Such means preferably consist of a plurality of aerators or diffusers which may easily be installed at a comparatively small expense.

In order that my invention may be clearly set forth and understood, I now describe, with reference to the accompanying drawings, the preferred manner in which my invention is performed. In the drawings, Figure 1 is an elevational view of apparatus for manufacturing water gas, for washing the gas with a liquid and for treating the liquid in recirculation, parts being shown in section; and Fig. 2 is a plan view of a portion of the recirculating tank of Fig. 1.

Similar characters of reference designate similar parts in each of the several views of the drawings.

Referring to Figs. 1 and 2, it is assumed that water gas is being manufactured in a generator 1, a carburetter 2, and a superheater 3 in the usual manner which need not be described herein. The gas made during the run period flows through a conduit 4 into a tar batter or wash-box 5 of the usual type.

In prior water-gas manufacture, the function of the wash-box has been two-fold, first, to provide a seal against readmission of the valuable gas to the superheater, during periods when products of combustion were being passed through the latter, and, second, to effect a preliminary washing, cooling and tar removal. For this purpose, a body of water has been maintained within the wash-box, the water level being regulated by a seal-regulating device of well-known character, such as that shown at 6. Clean water was supplied to the wash-box through a spray system similar to the spray system 7, and the overflow was passed through separating apparatus for the removal of tarry matter, and returned to the wash-box for further use.

In the present instance, I replace the water ordinarily supplied to the wash-box with a solution of from 1 to 2.5% of sodium carbonate, containing up to 0.01% of nickel or cobalt sulphide or up to 0.1% or iron sulphide as described in my aforesaid copending application. This solution is supplied to the wash-box 5 through the spray system 7 and comes into contact with the gas which flows through the wash-box and absorbs hydrogen sulphide and hydrogen cyanide therefrom. These impurities are initially absorbed as either sodium hydrosulphide or sodium cyanide, or both. The presence of the metallic compounds effects the conversion of the former to fixed salts, i. e., sodium thiosulphate, while the sodium cyanide reacts to sodium thiocyanate. I assist this conversion by removing the foul solution from contact with the gas and aerating it in the manner which will now be described.

The foul solution passes through a conduit 8 by gravity and enters one end of a recirculating tank 9. This tank is preferably rectangular in shape and may be about 75 feet long, when used in the manufacture of carburetted water gas. It is provided with a plurality of vertical baffles 10 which cause a tortuous flow of the solution and thereby effect a gravity separation of tar and tarry matter in general. The solution after having been freed from substantially all of its tar content by traversing the tank 9, passes through a pair of conduits 11 disposed in the manner shown in the drawings into a clean water compartment 12. By means of a series of parallel vertical baffles 13, I subdivide the compartment 12 into a number of communicating passages. Within and near the bottom of each of these passages is situated one or more porous aerators 14 supplied with compressed air from an air line 15.

The preferred type of aerator is that shown and described in the copending application of Gilbert E. Seil, Serial No. 21,978, filed April 9, 1925, but other aerators may be used. By means of finely comminuted air, introduced through the aerators 14, the conversion of intermediate products in the recirculating solution is completed.

Additions of fresh alkali and metallic compound are made as often as necessary by adding these materials to the solution in compartment 12 or elsewhere, as convenient. The appearance of a sulphur foam is an indication that an excess of metallic compound has been added. Upon the appearance of such a foam, the addition of metallic compound should be suspended until sulphur is no longer visible. The solution leaving compartment 12 is drawn by a pump 16 through a conduit 17 and is forced through a conduit 18 and sprays 7 into the wash-box 5 for further use.

When the concentration of thiosulphate and thiocyanate in the circulating solution reaches a predetermined point as specified in my copending application, portions of the liquid in circulation may be withdrawn through a conduit 19 for recovery of constituents or for any other suitable disposition.

A consideration which is peculiar to the present invention lies in the fact that the tar must be separated from the alkaline solution by gravity. In ordinary water-gas practice, the tar, having a specific gravity of about 1.09, is heavier than the wash water, and sinks in the latter, being withdrawn from the bottom of the tar separator. In practicing my invention, care should be taken to avoid having the specific gravity of the alkaline solution equal or nearly equal to that of the tar. The problem may be solved in either of two ways, first, by limiting the concentration of salts in the solution to such point as to keep the specific gravity of the solution below 1.09, the specific gravity of the tar, or, second, by allowing the salts in the solution to accumulate to such an extent as to raise the specific gravity of the solution to above that of the tar. In the first instance, the tar sinks and is drawn off from the bottom of the separator; in the second instance, the tar floats, and is withdrawn from the surface of the solution in the separator.

Although I have described my invention with reference to the purification of carburetted water gas, it is not limited to such use, but may also be applied to blue water gas, to oil gas, such as made by the well-known Jones process, or to other generator gases. In fact, my invention is particularly easily accomplished in the treatment of oil gas, in that the separation of tar, and the attendant difficulties, such as the regulation of the specific gravity of the solution, is avoided in such processes. It may further be noted that, in water gas processes involving the use of bituminous coal as fuel, my process has an especial utility in completely removing the hydrogen cyanide which is evolved in larger quantities than in normal operation with coke as generator fuel.

It will be seen from the foregoing description that I accomplish an effective purification of water gas in apparatus which is normally provided in a water-gas plant and which is only slightly modified. The usual functions of this apparatus are in no way interfered with and the obvious advantages of an immediate purification of the water gas are realized at slight expense.

It is not expected that a complete purification of the water gas will always be accomplished in this way, and further purification means such as iron-oxide boxes or a liquid purification system may be required to complete the purification of gas. However, the employment of my present invention makes it possible to construct such subsequent purification apparatus on a much smaller scale and to operate it at greatly reduced expenses and this constitutes an advantage of my invention.

While I have described my invention in reference to a particular embodiment and procedure, I do not intend to limit it to such specific illustrative example, but it may be variously embodied and practiced within the scope of the following claims.

I claim as my invention:

1. The process of purifying generator gas from acidic impurities which comprises washing the gas in the tar batter with a liquid capable of absorbing said impurities from the gas.

2. The process of purifying generator gas which comprises washing the gas in the tar batter with a solution of sodium carbonate containing sufficient catalyst to substantially entirely convert absorbed acidic impurities to fixed soluble compounds.

3. The process of removing tar and acidic impurities from water gas which comprises washing the gas immediately after it leaves the superheater with an alkaline absorbent liquid.

4. In a process of treating generator gas, the step which consists in adding to the wash water employed in the tar batter sufficient alkali and catalyst to cause absorption and fixation of hydrogen sulphide without liberation of free sulphur.

5. In a process of purifying generator gas, the step which comprises effecting an absorption and fixation of hydrogen sulphide and hydrogen cyanide in the wash liquid recirculating system.

6. The process of purifying generator gas from volatile impurities which comprises washing the gas in the tar batter with an alkaline absorbent solution, the specific gravity of which differs from that of the tar removed from the gas.

7. The process of purifying water gas from volatile impurities which comprises washing the gas in the tar batter with an alkaline absorbent solution the specific gravity of which is such as to cause tar to separate therefrom.

8. A process of purifying generator gas which comprises washing the gas with an alkaline absorbent liquid to remove tar and volatile impurities, separating tar from the liquid, regenerating the liquid, and returning it to contact with the flowing gas.

9. Apparatus for purifying generator gas which comprises a wash box, a recirculating tank provided with a compartment having a plurality of baffles for causing the deposition of tarry matter, and a compartment provided with aeration means; and means for recirculating an absorbent liquid through a cycle consisting of said wash-box and said recirculating tank.

10. In combination, a water gas generator, a tar batter in the path of the water gas from the generator, aeration means and means for recirculating an absorptive liquid through a cycle comprising said tar batter and said aeration means.

11. In combination, a water gas generator, a tar batter in the path of the water gas from the generator, aeration means, means for recirculating an absorptive liquid through a cycle comprising said tar batter and said aeration means and tar-separating means in the path of said liquid from said tar batter to said aeration means.

In testimony whereof, I have hereunto subscribed my name this seventeenth (17) day of February, 1927.

FREDERICK W. SPERR, Jr.